US010911695B2

(12) United States Patent
Okuno et al.

(10) Patent No.: US 10,911,695 B2
(45) Date of Patent: Feb. 2, 2021

(54) INFORMATION PROCESSING APPARATUS, INFORMATION PROCESSING METHOD, AND COMPUTER PROGRAM PRODUCT

(71) Applicants: KABUSHIKI KAISHA TOSHIBA, Tokyo (JP); TOSHIBA DIGITAL SOLUTIONS CORPORATION, Kawasaki (JP)

(72) Inventors: Shun Okuno, Kawasaki Kanagawa (JP); Hiroki Ueda, Tokyo (JP); Hiroyuki Itakura, Tokyo (JP)

(73) Assignees: KABUSHIKI KAISHA TOSHIBA, Tokyo (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/433,012

(22) Filed: Jun. 6, 2019

(65) Prior Publication Data

US 2020/0228729 A1    Jul. 16, 2020

(30) Foreign Application Priority Data

Jan. 11, 2019    (JP) ................. 2019-003666

(51) Int. Cl.
*H04N 5/272* (2006.01)
*G06K 9/00* (2006.01)
(Continued)

(52) U.S. Cl.
CPC ......... *H04N 5/272* (2013.01); *G06K 9/00248* (2013.01); *G06T 5/50* (2013.01); *G06T 7/11* (2017.01); *H04N 2005/2726* (2013.01)

(58) Field of Classification Search
CPC .......... H04N 5/272; H04N 2005/2726; G06K 9/00248; G06T 7/11; G06T 5/50
See application file for complete search history.

(56) References Cited

U.S. PATENT DOCUMENTS

| 6,453,052 B1* | 9/2002 | Kurokawa | ............. G06T 11/00 |
| | | | 30/30 |
| 2005/0018140 A1* | 1/2005 | Ishizaki | ................. G06F 3/011 |
| | | | 353/28 |

(Continued)

FOREIGN PATENT DOCUMENTS

| JP | 2011-065285 | 3/2011 |
| JP | 2013-226286 | 11/2013 |
| JP | 2020-016961 | 1/2020 |

OTHER PUBLICATIONS

Haijima, et al. "A Proposal and Implementation of Vicarious with Face Detection and Composition", Information Processing Society memoir IPSJ SIG Technical Report, vol. 2014-HCI-I57 No. 74, vol. 2014-GN-9I No. 74, vol. 2014-EC-3I No. 74, Mar. 15, 2014.

Primary Examiner — Jason A Flohre
(74) Attorney, Agent, or Firm — Amin, Turocy & Watson, LLP

(57) ABSTRACT

An information processing apparatus includes a detector, a generator, and a compositor. The detector detects a first image region including a specific part of a subject from a first image obtained by photographing the subject. A generator generates a plurality of mask images for specifying a region to be composited with a second image including the first image region. The compositor composites the first image with the second image using the mask images. The mask images each include a region having higher luminance than luminance of the other regions out of regions of the first image, in a region in contact with another mask image or a region overlapping another mask image.

5 Claims, 13 Drawing Sheets

(51) Int. Cl.
*G06T 7/11* (2017.01)
*G06T 5/50* (2006.01)

(56) References Cited

U.S. PATENT DOCUMENTS

| | | | |
|---|---|---|---|
| 2011/0206282 A1* | 8/2011 | Aisaka | G06T 11/60 |
| | | | 382/195 |
| 2013/0282344 A1* | 10/2013 | Flagg | G06T 15/503 |
| | | | 703/6 |
| 2018/0012386 A1* | 1/2018 | Kemelmaher | G06T 11/60 |
| 2019/0279347 A1* | 9/2019 | Hayasaka | G06T 5/50 |
| 2020/0027244 A1 | 1/2020 | Ueda et al. | |

* cited by examiner

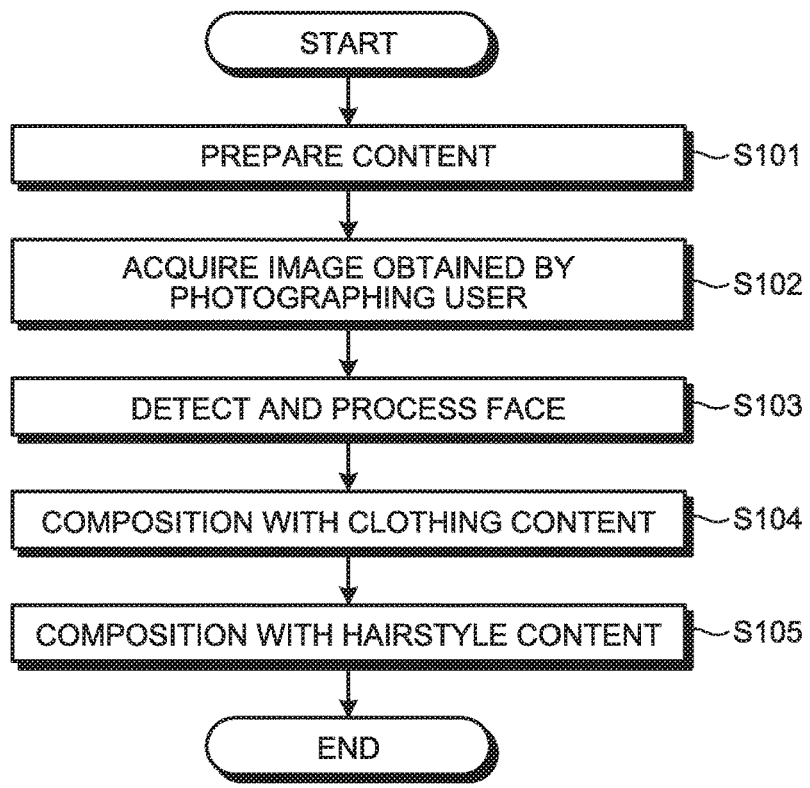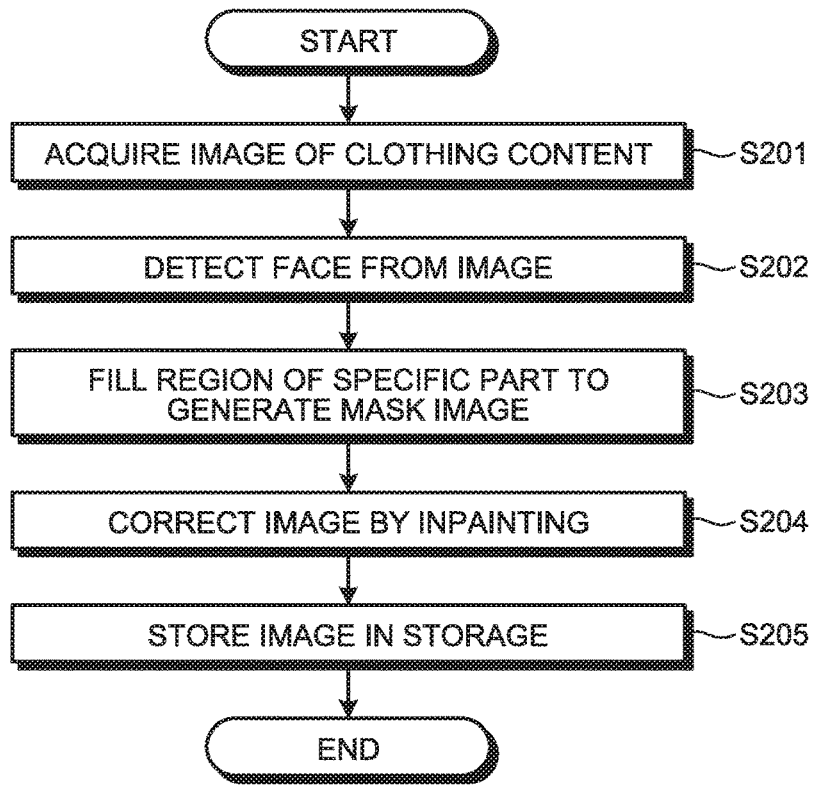

FIG.5
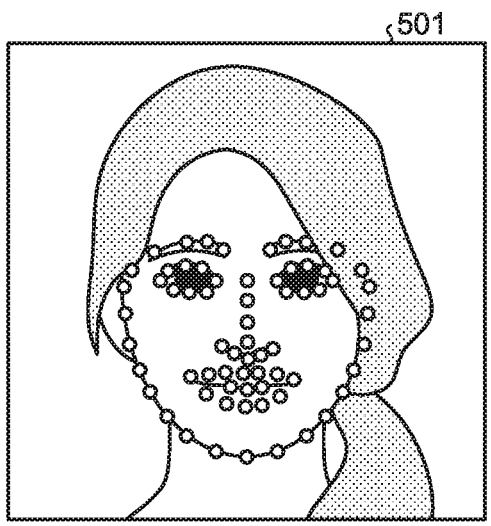
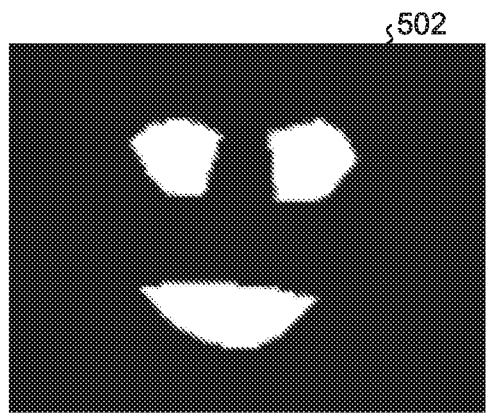
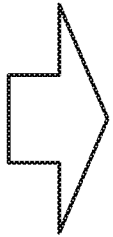
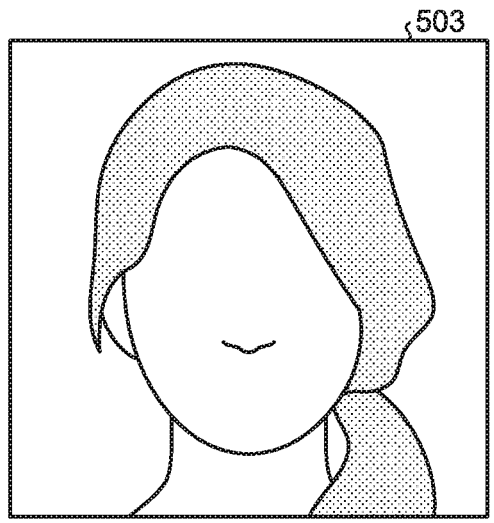

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2019-003666, filed on Jan. 11, 2019; the entire contents of which are incorporated herein by reference.

FIELD

Embodiments described herein relate generally to an information processing apparatus, an information processing method, and a computer program product.

BACKGROUND

Widely known are techniques for compositing a plurality of images, such as techniques for compositing a face of a person detected from a certain image with a face region of another image and techniques for compositing an image of a hairstyle (hairstyle content) with another image. For example, there has been developed a technique called poisson image editing for smoothly compositing a contour (boundary) part of a region to be composited, such as a face.

BRIEF DESCRIPTION OF THE DRAWINGS

FIG. 3 is a flowchart of an example of the entire procedure of composition according to the present embodiment;

FIG. 4 is a flowchart of an example of processing for preparing a clothing content;

FIG. 5 is a schematic of a specific example of the processing for preparing a clothing content;

DETAILED DESCRIPTION

Figure 1:
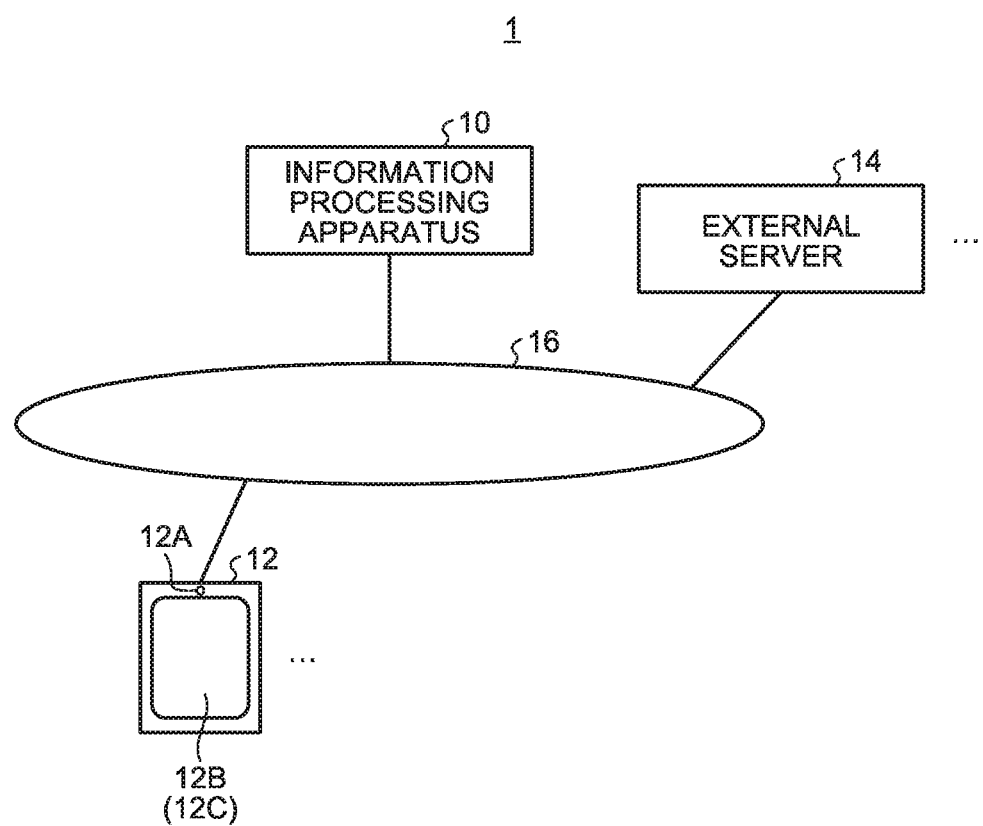
FIG. 1 is a schematic of an information processing system.

According to one embodiment, an information processing apparatus includes a detector, a generator, and a compositor. The detector detects a first image region including a specific part of a subject from a first image obtained by photographing the subject. A generator generates a plurality of mask images for specifying a region to be composited with a second image including the first image region. The compositor composites the first image with the second image using the mask images. The mask images each include a region having higher luminance than luminance of the other regions out of regions of the first image, in a region in contact with another mask image or a region overlapping another mask image.

The conventional techniques may possibly fail to perform high-quality composition. The techniques, such as poisson image editing, may possibly fail to generate a natural composite image due to a great effect of a characteristic color (e.g., bangs and a shadow) present near a region to be composited.

An information processing apparatus according to an embodiment includes a detector, a generator, and a compositor. The detector detects a first image region including a specific part of a subject from a first image obtained by photographing the subject. The generator generates a plurality of mask images for specifying a region to be composited with a second image including the first image region. The compositor composites the first image with the second image using the mask images. The mask images each include a region having higher luminance than that of the other regions out of the regions of the first image in a region in contact with another mask image or a region overlapping another mask image.

Exemplary embodiments of an information processing apparatus according to the present invention are described below in greater detail with reference to the accompanying drawings.

In compositing a face region, for example, the use of a high-quality image enables high-quality composition. By contrast, if an image (photograph) taken in a photographing place, such as a beauty salon, is used, a high-quality image fails to be used due to effects of an unstable light environment (e.g., entry of natural light, backlight, and various kinds of lighting equipment) of the photographing place. As a result, the quality of the composition may possibly deteriorate. To address this problem, there has been developed a technique of acquiring the pixel values of a foreground image and a background image. This technique, however, requires a longer performance time.

In compositing a face (especially, a thin face) with a hairstyle content obtained by removing a face region with high accuracy, for example, the hairstyle content does not match the contour of the face, thereby failing to obtain a high-quality composite image.

To address this problem, poisson image editing described above may be employed. Poisson image editing can perform composition emphasizing the contrast, resistant to changes in the light environment, and having higher flexibility in matching the contour of the face. Poisson image editing usually uses a mask image, which is an image for specifying a region to be composited (face region when a face image is to be composited). Poisson image editing estimates the pixel values inside the region from the pixel values around the region specified by the mask image. Consequently, poisson image editing can composite images more smoothly.

Various methods for detecting a face from an image are known, including a method using machine learning, such as deep learning. This method, however, does not have sufficient teaching data for performing face detection. As a result, the method has low accuracy especially in detecting a face from an image of a person wearing glasses. If a person wears black-rimmed glasses, for example, the method fails to detect the eyes and the eyebrows with high accuracy. As a result, the method has unstable accuracy in face detection. Furthermore, the method described above fails to detect rotation of a face. As a result, the method fails to perform high-quality face composition unless the image of the subject is taken horizontally.

These problems can be solved by employing a method of detecting not rectangular information corresponding to the entire face but a plurality of parts included in the face using machine learning, for example. There has been developed a method of detecting a total of 68 feature points corresponding to the parts, such as eyes, eyebrows, a nose, a mouth (lips), and a chin, from a face image using a model (learning model) obtained by machine learning, for example. The points are defined in advance, and the method can detect which position and part the points correspond, such as "the corner of the right eye" and "the right corner of the lips".

Even if the detection method described above is employed, the conventional technique may possibly fail to generate a high-quality composite image due to a great effect of a characteristic color (e.g., a color having lower luminance, such as bangs and a shadow) present near a region to be composited (e.g., a part of a face) when using poisson image editing to composite images, for example.

To address this, the present embodiment refers to information on a to-be-composited part detected using machine learning and generates a plurality of mask images as mask images used to specify a region with which the image is to be composited. The mask images are each generated such that a region having higher luminance than that of the other regions out of the regions in the image to be composited is included in a region in contact with another mask image or a region overlapping another mask image. Consequently, the present embodiment can reduce the effect of the characteristic color present near the region to be composited and can composite images with high quality.

While the following mainly describes a case where poisson image editing is used as an image composition technique, an applicable image composition technique is not limited thereto. The present embodiment may employ another image composition technique of smoothly compositing the contour of a region to be composited using a mask image. For example, the present embodiment may employ a technique of correcting the pixel values using a gamma curve and compositing images (e.g., Japanese Patent Laid-open No. 2013-226286).

FIG. 1 is a schematic of an information processing system 1 according to the present embodiment.

The information processing system 1 includes an information processing apparatus 10, a terminal device 12, and an external server 14. The information processing apparatus 10, the terminal device 12, and the external server 14 are connected via a network 16 in a manner capable of communicating one another wiredly or wirelessly.

The information processing system 1 according to the present embodiment includes one information processing apparatus 10, one external server 14, and one terminal device 12, for example. In the information processing system 1, at least one of the information processing apparatus 10, the terminal device 12, and the external server 14 may be provided in plurality.

While the network 16 is the Internet, for example, it may be other networks having any desired form.

The information processing apparatus 10 generates composite images. The composite images will be described later in greater detail.

The terminal device 12 is operated by a user. The terminal device 12 is a mobile terminal or a smartphone, for example. The terminal device 12 according to the present embodiment is operated by a first subject.

The first subject is a user who virtually tries other forms.

Virtually trying other forms means virtually trying at least one form out of forms of head hair, patterns of tattoos and the like drawn on a skin, and items. The items can be worn by the user. Examples of the items include, but are not limited to, clothes, accessories, wigs, glasses, masks, etc. Examples of the clothes include, but are not limited to, coats, skirts, pants, shoes, hats, swimsuits, etc.

The user may be a living thing or a non-living thing. The living thing is a person, for example. The living thing is not limited to a person and may be an animal other than a person, such as a dog and a cat. The non-living thing is a mannequin having the shape of a person and an animal and other objects, for example. The non-living thing is not limited thereto. The present embodiment describes a case where the user is a person. When persons, such as the first subject, are generically described, they are simply referred to as the user.

The terminal device 12 includes a photographing unit 12A, an input unit 12B, and a display 12C.

The photographing unit 12A photographs the first subject to obtain a first subject image corresponding to an image of the first subject. The first subject image is an example of a subject image. The photographing unit 12A is a digital camera, for example.

The data form of the first subject image is not particularly limited. The first subject image is an image defining the pixel values indicating the color, the luminance, and the like for respective pixels, for example. The first subject image is not limited to a bitmap image.

The input unit 12B receives operating instructions from the user. The input unit 12B is a keyboard, a mouse, and an input button, for example.

The display 12C displays various images. The display 12C according to the present embodiment displays composite images generated by the information processing apparatus 10. The display 12C is a liquid crystal display (LCD) or an organic electro-luminescence (EL) display, for example. The input unit 12B and the display 12C may be integrated. In this case, the input unit 12B and the display 12C are provided as a touch panel, for example.

The external server 14 is a server device that can process big data including various kinds of information, such as a second subject image (second image) used for composition, forms of head hair, patterns of tattoos and the like drawn on a skin, items worn by a second subject, and information on the items. The external server 14 according to the present embodiment stores therein the second subject image and the information on the forms of head hair, the patterns of tattoos, and the items. The second subject is a subject different from the first subject. The second subject image is a subject image of the second subject. The second subject image will be described later in greater detail.

In the information processing system 1 according to the present embodiment, the information processing apparatus 10 generates a composite image using the first subject image taken by the terminal device 12 and the second subject image acquired from the external server 14, for example. The information processing apparatus 10 supplies the composite image to the terminal device 12.

The following describes the information processing apparatus 10 in greater detail.

Figure 2:
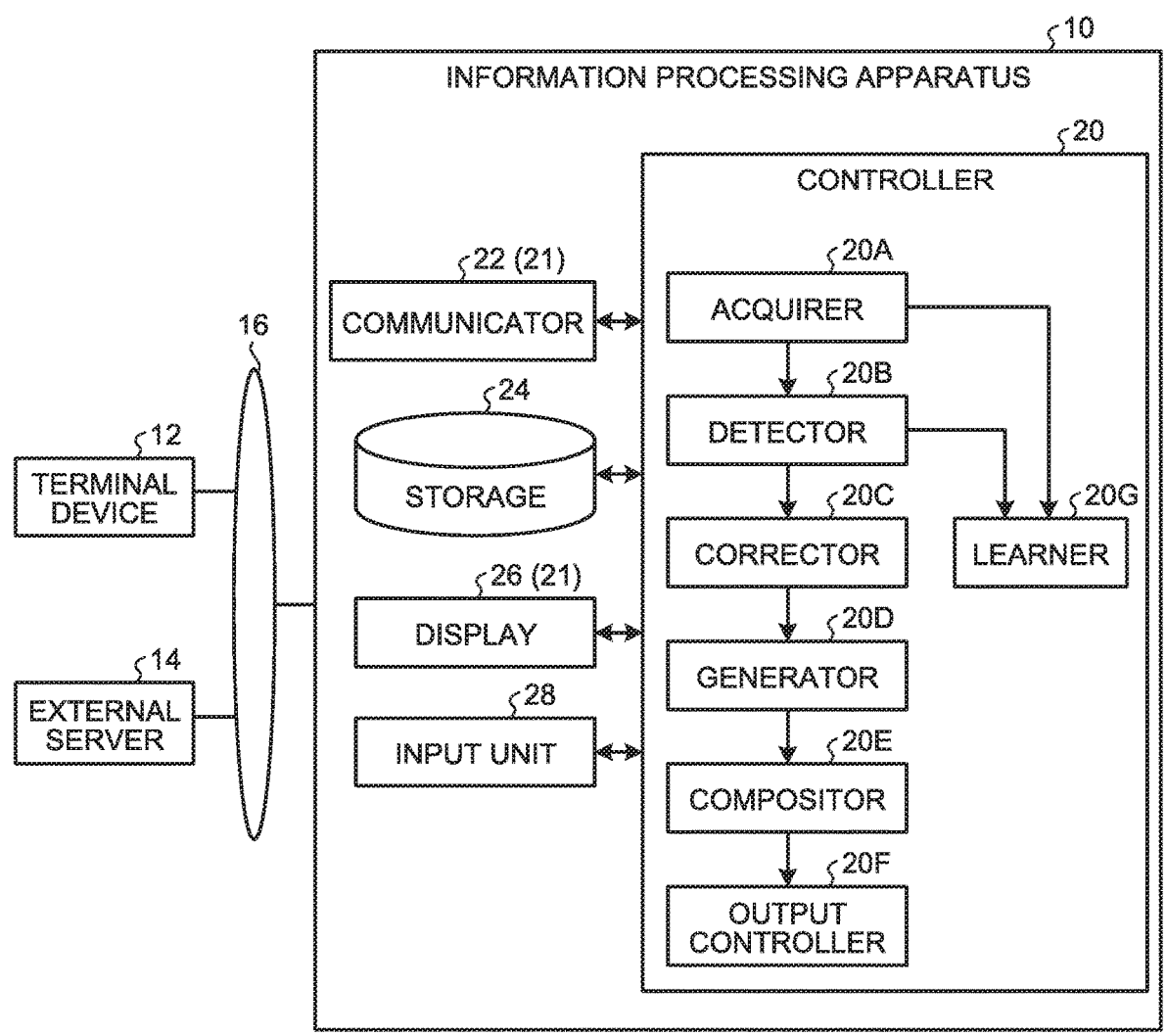
FIG. 2 is a functional block diagram of an information processing apparatus.

FIG. 2 is an example of a functional block diagram of the information processing apparatus 10. FIG. 2 also illustrates the terminal device 12 and the external server 14 for convenience of explanation of input and output of data.

The information processing apparatus 10 includes a controller 20, a communicator 22, storage 24, a display 26, and an input unit 28. The communicator 22, the storage 24, the display 26, and the input unit 28 are connected to the controller 20 in a manner capable of transmitting and receiving data and signals.

The communicator 22 is a communication interface that communicates with the terminal device 12 and the external server 14 via the network 16.

The storage 24 stores therein various kinds of data. The storage 24 stores therein the first subject image, teaching data, a learning model, and second subject information, for example.

The storage 24 is provided as any widely available storage medium, such as a flash memory, a memory card, a random access memory (RAM), a hard disk drive (HDD), and an optical disc. Instead of the storage 24 included in the information processing apparatus 10, a storage device (e.g., a cloud storage) connected to the network 16 may store therein the various kinds of data.

The teaching data is used for learning a learning model. The teaching data indicates correspondence between the first subject image and a composition region. The composition region is a region in the first subject image to be composited with the second subject image.

The composition region is a face region in the first subject image, for example. The face region includes eyes, eyebrows, a nose, a mouth, and a chin, which are parts constituting a face of a person. A region including part of these parts may be defined as the face region. While the following describes a case where the face region is the composition region, that is, where a face image is to be composited with another image, the composition region is not limited to the face region.

The learning model is a model for detecting the composition region from a subject image. The learning model is learned using the teaching data by processing performed by the controller 20, which will be described later.

The storage 24 stores therein the first subject image and the composition region detected from the first subject image in a manner associated with each other as the teaching data. The storage 24 stores therein a plurality of pieces of teaching data. The teaching data may be already generated or generated by the controller 20 and stored in the storage 24, for example.

The controller 20, for example, detects the face region of the first subject image as the composition region from the first subject image using an image processing technique and a face recognition technique. The controller 20 stores the correspondence between the first subject image and the detected face region as the teaching data in the storage 24. The controller 20 may appropriately add new teaching data and correct the composition region by performing processing, which will be described later, for example.

The teaching data may further include metadata. Examples of the metadata include, but are not limited to, sex, angle of a face, etc.

The second subject information associates the second subject image and an object region. The second subject information may further include supplementary information.

While the data form of the second subject information is a database form, for example, it is not limited thereto.

The second subject image includes the face and clothes of the second subject, for example. Similarly to the first subject, the second subject may be a living thing or a non-living thing, such as a mannequin. The present embodiment describes a case where the second subject is a person, for example.

The second subject image according to the present embodiment includes a trial object part for the first subject.

The trial object part indicates a form to be virtually tried by the first subject. As described above, the first subject virtually tries at least one form out of the forms of head hair, the patterns of tattoos and the like drawn on a skin, and the items. The trial object part indicates the form to be virtually tried. Specifically, the trial object part is at least one of a head hair part, a skin part, and an item worn by the second subject. Examples of the item are the same as those described above.

If the trial object part is a head hair part, the first subject virtually tries a hairstyle indicated at the head hair part in the second subject image. If the trial object part is a pattern drawn on a skin, the first subject virtually tries a pattern indicated at the skin part in the second subject image. If the trial object part is an item, the first subject virtually tries an item worn by the second subject in the second subject image. These virtual trials are carried out by supplying the composite image by the controller 20, which will be described later.

The composition region is a region in the first subject image adjacent to the trial object part. In other words, the composition region is a region in the first subject image adjacent to the region corresponding to the trial object part in the second subject image. If the trial object part is a head hair part, for example, the composition region is a face region in the first subject image. The face region is a region adjacent to the head hair part in the first subject image. If the trial object part is a pattern drawn on a back, the composition region is a region adjacent to the back in the first subject image, such as an arm part, a neck part, and a buttocks part. If the trial object part is an item, such as clothes, the composition region is a region adjacent to the clothes in the first subject image, such as an arm part and a head part.

The following describes the object region. The object region is a region in the second subject image corresponding to the composition region. The region corresponding to the composition region indicates a region in the second subject image including the same parts as those in the composition region in the first subject image. The parts indicate eyes, eyebrows, a nose, a mouth, and a chin, which constitute a body of a person, for example.

If the composition region is a face region, for example, the object region is a face region of the second subject in the second subject image. In the following description, the object region indicating the face region may be referred to as an object region A. The shapes of the object region and the composition region are not particularly limited. To facilitate alignment in composition, the shapes of the composition region and the object region may be a rectangle. The object region and the composition region preferably have the same shape. The object region and the composition region may have different sizes. At least part of the lines indicating the respective outer peripheries of the object region and the composition region may have different shapes.

The second subject information according to the present embodiment registers the second subject image of at least one second subject. Alternatively, the second subject information may register the second subject images of a plurality of different second subjects. The second subject information may register a plurality of second subject images of one second subject in which at least one of the form of the head hair part, the worn item, and the pattern drawn on the skin is different. The second subject information may register a plurality of second subject images of one second subject taken at different photographing angles. The second subject information registers the object regions in a manner associated with the respective second subject images.

The supplementary information is information on the corresponding second subject image. The supplementary information is identification information on the second subject in the second subject image, a word indicating a hairstyle of the head hair part of the second subject, information on a beauty salon that can provide the hairstyle, a name of an item worn by the second subject, and information on a shop that can provide the item, for example. The identification information on the second subject is a user name of the second subject, for example. These pieces of information may be information indicating the location on the Internet (uniform resource locator (URL)) at which they are stored.

At least one of the second subject image, the object region, and the supplementary information may be registered in the second subject information by the controller 20 storing the information acquired from the external server 14 in the storage 24. The object region may be generated by image processing using the second subject image and registered in the second subject information by the controller 20. The image processing is performed by a known image processing method.

Referring back to FIG. 2, the display 26 displays various kinds of information. The display 26 is an LCD or an organic EL display, for example.

At least one of the display 26 and the communicator 22 serves as an output unit 21. The output unit 21 outputs various kinds of information. The output unit 21 displays the various kinds of information, thereby serving as the display 26. The output unit 21 transmits the various kinds of information to the terminal device 12 and the external server 14 via the network 16, thereby serving as the communicator 22.

The input unit 28 receives operating instructions from the user. The input unit 28 is a keyboard, a mouse, and an input button, for example. The display 26 and the input unit 28 may be integrated. In this case, the display 26 and the input unit 28 are provided as a touch panel, for example.

The following describes the controller 20.

The controller 20 controls the information processing apparatus 10. The controller 20 includes an acquirer 20A, a detector 20B, a corrector 20C, a generator 20D, a compositor 20E, an output controller 20F, and a learner 20G. Part or all of the acquirer 20A, the detector 20B, the corrector 20C, the generator 20D, the compositor 20E, the output controller 20F, and the learner 20G may be provided by causing one or more processors, such as a central processing unit (CPU), to execute a computer program, that is, by software. Alternatively, part or all of them may be provided by hardware, such as one or more integrated circuits (IC), or by a combination of software and hardware.

The acquirer 20A acquires a first subject image to be composited. The acquirer 20A, for example, acquires a first subject image taken by the terminal device 12 from the terminal device 12 via the network 16 and the communicator 22.

The first subject, for example, operates the input unit 12B in a virtual trial, thereby instructing the photographing unit 12A to perform photographing. If the photographing unit 12A acquires a first subject image by photographing, the terminal device 12 transmits the first subject image to the information processing apparatus 10 via the network 16. The terminal device 12 may transmit, to the information processing apparatus 10, a first subject image selected by an operation performed by the first subject through the input unit 12B out of the first subject images stored in the storage of the terminal device 12.

The photographing angle of the first subject image may possibly not match the taken image of the second subject image stored in the information processing apparatus 10. In this case, the terminal device 12 may display, on the display 12C, information for requesting the first subject to perform re-photographing after adjusting the photographing angle. The first subject adjusts the angle of the terminal device 12 to adjust the photographing angle of the photographing unit 12A and instructs the photographing unit 12A to perform photographing again. The terminal device 12 transmits the first subject image obtained by re-photographing to the information processing apparatus 10.

By the processing described above, the acquirer 20A acquires the first subject image from the terminal device 12.

The detector 20B detects the composition region (first image region) from the first subject image (first image) of the first subject using the learning model. Specifically, the detector 20B inputs the first subject image acquired by the acquirer 20A in the learning model for detecting the composition region from the subject image, thereby detecting the composition region from the first subject image.

The learning model defines the subject image, such as the first subject image, as input data and defines the composition region as output data. In other words, the learning model is an application program for modeling and calculating an input-output relation between the first subject image and the composition region. The learning model may be expressed by a mathematical expression, such as a function.

As described above, the composition region is a region in the first subject image adjacent to the trial object part and differs depending on the trial object part. The storage 24 may store therein, for each of the trial object parts, the learning model for detecting the composition region serving as a region adjacent to the corresponding trial object part.

In this case, the acquirer 20A acquires the first subject image and information indicating the trial object part from the terminal device 12. The first subject operates the terminal device 12, thereby selecting the trial object part (e.g., the head hair part). The terminal device 12 transmits the information indicating the selected trial object part and the first subject image to the information processing apparatus 10. The detector 20B reads, from the storage 24, the learning model corresponding to the trial object part acquired from the terminal device 12 via the acquirer 20A. The detector 20B uses the read learning model and the acquired first subject image, thereby detecting the composition region from the first subject image.

The learning model is learned by the learner 20G and stored in the storage 24 in advance. The learner 20G according to the present embodiment learns the learning model by machine learning using the teaching data. The machine learning is performed by a known method. If the learning model is a model using a neural network, such as convolutional neural network (CNN) and recurrent neural network (RNN), for example, the learner 20G learns the learning model by deep learning.

To learn the learning models for the respective trial object parts, pieces of teaching data that each register the composition region adjacent to the corresponding trial object part are prepared for the respective trial object part. The learner 20G performs machine learning using the pieces of teaching data corresponding to the respective trial object parts, thereby generating the learning models corresponding to the respective trial object parts.

The present embodiment describes a case where the trial object part is the head hair part, and the composition region is the face region, for example. The storage 24 according to the present embodiment stores therein the learning model corresponding to the head hair part (learning model for detecting the face region).

The teaching data may possibly be updated by the processing described later. Every time the teaching data is updated, the learner 20G may perform machine learning using the teaching data resulting from update, thereby updating the learning model. If the teaching data is not updated, the information processing apparatus 10 does not necessarily include the learner 20G and may use the learning model learned in advance and stored in the storage 24, for example.

The detector 20B uses the learned learning model, thereby detecting the composition region from the first subject image of the first subject. To detect the face region, for example, the detector 20B may use the learning model learned so as to detect a total of 68 feature points corresponding to predetermined parts (e.g., eyes, eyebrows, a nose, a mouth, and a chin) from an image obtained by photographing a face as described above. The detector 20B may detect, as the composition region, a region including a part corresponding to a specific feature point out of the feature points detected by the learning model. In the following description, the part corresponding to the specific feature point, that is, the part included in the composition region may be referred to as a specific part.

The detector 20B may detect metadata, such as the angle of the face, from the detected parts. The detector 20B may detect inclination of the line segment joining both detected eyes as the angle of the face, for example. The information including the detected angle is referred to when the corrector 20C corrects the image, for example.

The detector 20B may possibly fail to detect the composition region from the first subject image. In this case, the detector 20B acquires the first subject image again from the terminal device 12 via the acquirer 20A and detects the composition region.

As described above, the teaching data may include metadata, such as sex and angle of a face.

In this case, the learner 20G may learn the learning model defining the first subject image and the metadata as input data and defining the composition region as output data. Alternatively, the learner 20G may learn the learning model defining the first subject image as input data and defining the composition region and the metadata as output data.

In this case, the detector 20B can detect the composition region from the first subject image and the metadata using the learning model. Alternatively, the detector 20B can detect the composition region and the metadata from the first subject image using the learning model.

To generate an image (e.g., a clothing content and a hairstyle content, which will be described later) by correcting the second subject image, the detector 20B may perform, on the second subject image, the same processing (e.g., detection of the face region) as that performed on the first subject image. The corrector 20C corrects a region (second image region) detected from the second subject image.

The corrector 20C corrects an image. The corrector 20C, for example, corrects the pixel values of the region (second image region) of the part specified out of the parts detected from the second subject image based on the pixel values of the pixels around the region. The corrector 20C corrects the pixel values of the pixels in the regions of eyes, eyebrows, and a mouth, for example, to the pixel values of the pixels around the regions. As a result, the regions are corrected in a manner filled with the same colors as those of the regions therearound. The corrector 20C corrects the image of the second subject image in this manner, thereby enabling high-quality composition of the images.

The corrector 20C may resize (enlarge and reduce) the whole first subject image. The corrector 20C reduces the first subject image, for example, thereby reducing the amount of processing. Furthermore, the corrector 20C may correct at least one of the composition region and the object region so as to reduce the difference of properties between the composition region and the object region. Examples of the properties include, but are not limited to, size, inclination, direction, etc. of the composition region (e.g., the face region). The corrector 20C, for example, corrects the composition region such that the size, the inclination, and the direction of the face match between the composition region and the object region.

The corrector 20C, for example, rotates the face image serving as the composition region such that the angle of the face detected by the detector 20B matches. If the size of the composition region is different, the corrector 20C corrects (enlarges or reduces) the size of the composition region such that the size of the composition region matches that of the object region.

The generator 20D generates a plurality of mask images for specifying the composition region, which are used in image composition by poisson image editing, for example. The method for generating the mask images will be described later in greater detail.

The compositor 20E generates a composite image by compositing the composition region detected from the first subject image acquired by the acquirer 20A with the object region of the second subject image. The compositor 20E composites the composition region with the object region using the mask images generated by the generator 20D by poisson image editing, for example. The composition will be described later in greater detail.

The output controller 20F outputs the composite image generated by the compositor 20E to the output unit 21. As described above, the output unit 21 includes the communicator 22 and the display 26.

The output controller 20F displays the composite image on the display 26, thereby outputting the composite image. The output controller 20F transmits the composite image to the terminal device 12 via the network 16, thereby outputting the composite image to the terminal device 12. The output controller 20F transmits the composite image to the external server 14 via the network 16, thereby outputting the composite image to the external server 14.

The output unit 21 may be a digital signage (electronic signboard) connected to the network 16. In this case, the output controller 20F outputs the composite image to the digital signage.

The output controller 20F may output the composite image and related information on the second subject image used in composition of the composite image.

The related information is at least one of affinity between the characteristics of the first subject and the trial object part of the second subject image, a user name other than the first subject similar to the composite image, characteristic information indicating characteristics of the composite image, and difference information between the first subject and the second subject.

The affinity indicates the degree of affinity between the characteristics of the first subject in the first subject image used in composition of the composite image and the trial object part in the second subject image used in composition of the composite image.

The characteristics of the first subject may be characteristics of the trial object part in the first subject or characteristics of parts other than the trial object part. Examples of the characteristics of the first subject include, but are not limited to, characteristics of the face, hairstyle, taste for clothes, etc. of the first subject. Examples of the hairstyle include, but are not limited to, hair length, cutting position, hair quality, etc. The output controller 20F specifies the characteristics of the first subject using a known image analysis method and a known data analysis method using big data managed in the external server 14.

If the trial object part is the head hair part, for example, the affinity is information indicating the degree of affinity between the characteristics of the first subject in the composite image and the hairstyle indicated by the head hair part in the composite image. The affinity, for example, is expressed by an evaluation value for evaluating the composite image from a predetermined point of view, such as fashion sense. Specifically, the affinity is expressed by an evaluation value, such as the degree of coolness and the degree of cuteness, for evaluating the subject in the composite image.

While the affinity may be derived by any desired method, it may be derived by a method using a learning model for deriving the affinity, for example. The output controller 20F, for example, learns in advance a learning model for deriving the affinity from the combination of the characteristics of the first subject and the trial object part of the second subject image using known machine learning. The output controller 20F derives the affinity by inputting, to the learning model, the characteristics of the first subject in the first subject image used in composition of the composite image and the trial object part in the second subject image used in composition of the composite image.

The output controller 20F outputs the composite image and the affinity to the terminal device 12. Consequently, the output controller 20F can quantitatively supply, to the first subject, the affinity between the characteristics of the first subject, such as the hairstyle, the taste, and the face, and the trial object part, such as the form of head hair, the pattern drawn on a skin, and the item, in the second subject image used in composition of the composite image.

The output controller 20F outputs a plurality of composite images and the affinity of each of the composite images. As a result, the first subject who views the composite images and the affinity can objectively check the trial object parts (hairstyles indicated by forms of head hair, patterns, and items, such as clothes) that match his/her characteristics, such as the hairstyle and the taste.

The output controller 20F supplies the composite images and the affinity, thereby supplying various hairstyles, patterns, and items, such as clothes, corresponding to the characteristics of the first subject. As a result, the first subject can check the results of trial of various hairstyles, patterns, clothes, and the like from an objective point of view. Furthermore, the output controller 20F can provide the first subject with an opportunity to select the trial object part to be actually tried from an objective point of view.

The output controller 20F may derive information indicating the trial object part that can be provided by changing part of the form of the first subject in the first subject image corresponding to the characteristics of the first subject and output the information and the composite image to the output unit 21. The output controller 20F, for example, may output information indicating another hairstyle that can be provided depending on hair setting corresponding to the hair quality of the first subject. In this case, the first subject can objectively check, before getting a haircut, the form of hair arrangement after getting the haircut.

As described above, the related information may be a user name other than the first subject similar to the composite image.

In this case, the output controller 20F learns in advance a learning model for deriving the user name of the user similar to the composite image from the composite image by a known method. The output controller 20F inputs the composite image generated by the compositor 20E to the learning model, thereby deriving the user name similar to the composite image.

The output controller 20F, for example, outputs the composite image and the user name other than the first object similar to the composite image to the terminal device 12. The first subject who operates the terminal device 12 views the composite image and the user name, thereby readily checking what kind of user the composite image obtained by compositing his/her composition region with another second subject image is similar to.

Consequently, the information processing apparatus 10 can provide the first subject with an opportunity to analyze his/her fashion objectively. Furthermore, the information processing apparatus 10 can provide the first subject with an opportunity to pay attention to the fashion of the user identified by the output user name.

As described above, the related information may be characteristic information indicating the characteristics of the composite image. The characteristic information may be information expressing the characteristics of the composite image with a combination of a predetermined number or less words. While the predetermined number is five, three, or two words, for example, it is not limited thereto. While the characteristic information is "cool fashionable man", "hot sports style", and "cute coordinates", for example, it is not limited thereto.

In this case, the output controller 20F learns in advance a learning model for deriving the characteristic information on the composite image from the composite image by a known method. The output controller 20F inputs the composite image to the learning model, thereby deriving and outputting the characteristic information on the composite image.

The output controller 20F outputs the composite image and the characteristic information on the composite image. As a result, the first subject can readily grasp an impression of his/her trying the trial object part, such as an item, in the composite image. If the trial object part is the head hair part, the output controller 20F can supply both of the first subject and a hairdresser who cuts the head hair of the first subject with the information that enables them to share the impression resulting from the trial.

As described above, the related information may be difference information between the first subject and the second subject. Specifically, the related information may be difference information between the first subject in the first subject image used in composition of the composite image and the second subject in the second subject image used in composition of the composite image. Specifically, the difference information is difference in physical characteristics, such as build and age, between the first subject and the second subject. The build is expressed by an anthropometric measurement value, such as height, weight, and chest measurement.

In this case, the output controller 20F acquires the physical characteristics, such as build and age, of the first subject from the terminal device 12 or the external server 14. The output controller 20F may analyze the first subject image, thereby acquiring the physical characteristics of the first subject. The output controller 20F acquires the physical characteristics of the second subject from the external server 14. The output controller 20F may analyze the second subject image, thereby acquiring the physical characteristics of the second subject.

The output controller 20F calculates the difference between the physical characteristics of the first subject and those of the second subject, thereby deriving the difference information.

In this case, the output controller 20F outputs the composite image and the difference information to the terminal device 12.

The first subject who operates the terminal device 12 views the composite image and the difference information, thereby readily checking the difference in physical characteristics between the second subject in the second subject image in the composite image and him-/herself (first subject). Let us assume a case where the composite image indicates an appearance aimed at by the first subject. In this case, the output controller 20F makes the physical characteristics, such as weight, closer to those of the second subject in the second subject image in the composite image. Consequently, the output controller 20F can readily supply hairstyles and clothes that can be tried and impressions created when they are tried. The output controller 20F outputs the composite image and the difference information to the terminal device 12, thereby readily supplying information for supporting enhancement of motivation to improve a lifestyle, such as dieting.

The related information may include information indicating guidance to an electronic commerce (EC) site.

In this case, the output controller 20F specifies information indicating guidance to an EC site that can provide the trial object part, such as an item, included in the second subject image used in generation of the composite image. The output controller 20F, for example, reads the supplementary information corresponding to the second subject image from the second subject information, thereby specifying the information indicating guidance to an EC site. The output controller 20F outputs the composite image and the information indicating guidance to an EC site to the terminal device 12.

The information indicating guidance to an EC site is expressed by a two-dimensional barcode or a three-dimensional barcode, for example.

The output controller 20F outputs the composite image and the information indicating guidance to an EC site, thereby readily supplying the information for guiding to the EC site from the composite image. The acquirer 20A acquires information indicating that the information for guiding to the EC site is selected by the first subject from the terminal device 12. By acquiring the information from the terminal device 12, the controller 20 can determine the result of a user satisfaction questionnaire on the composite image and the ratio of conversion to the EC site.

The compositor 20E may create a plurality of composite images from one first subject image. Specifically, the compositor 20E may composite the composition region in the first subject image with each of a plurality of second subject images stored in the second subject information in the storage 24. In this case, the compositor 20E composites the composition region in one first subject image with each of the second subject images, thereby generating a plurality of composite images.

In this case, the output controller 20F may output all or part of the composite images generated by the compositor 20E.

The output controller 20F, for example, calculates the certainty indicating whether each of the composite images is a natural composition result. The certainty is a value indicating whether composition of the second subject image with the composition region in the composite image is a natural composition result. A higher certainty indicates that the composite image is a more natural composite result.

While the certainty may be derived by any desired method, it may be derived by a method using a learning model for deriving the certainty, for example. The output controller 20F, for example, learns in advance a learning model for deriving the certainty. The output controller 20F learns the learning model by a known method. To learn the learning model, the output controller 20F, for example, uses teaching data indicating correspondence between composite images previously generated by the controller 20 and the certainty to the respective composite images.

The certainty indicated in the teaching data is defined by a plurality of parameters, such as the result of a user satisfaction questionnaire on the corresponding composite image, the ratio of conversion to an EC site, the repeat ratio, and whether the composite image is saved to the terminal device 12.

The result of a user satisfaction questionnaire is information indicating satisfaction of the first subject with the composite image. The first subject who views the composite image using the terminal device 12, for example, operates the input unit 12B, thereby inputting satisfaction with the composite image. The information indicating satisfaction is transmitted from the terminal device 12 to the information processing apparatus 10 as the result of a user satisfaction questionnaire.

The ratio of conversion to an EC site is expressed by a probability that the first subject performs an operating input on the input unit 12B after the composite image is displayed on the terminal device 12 to access the supplementary information corresponding to the second subject image used in composition of the composite image. The repeat ratio is expressed by the number of times of access to the supplementary information.

The conversion ratio, the repeat ratio, and the information indicating whether the composite image is saved to the terminal device 12 are transmitted from the terminal device 12 to the information processing apparatus 10.

The output controller 20F of the information processing apparatus 10 learns the learning model using one or a plurality of pieces of teaching data indicating the correspondence between the certainty and the composite image corresponding to the certainty. The output controller 20F inputs the composite image generated by the compositor 20E to the learning model, thereby deriving the certainty of the composite image.

The output controller 20F selects a composite image having certainty of equal to or higher than a threshold as a composite image to be output. The threshold is determined in advance.

The output controller 20F may transmit, for a composite image determined not to be output, a retransmission request for re-photographing and retransmitting the first subject image to the first subject in the first subject image used in composition of the composite image. In this case, the output controller 20F transmits the retransmission request to the terminal device 12 operated by the first subject via the communicator 22 and the network 16.

The terminal device 12 that receives the retransmission request displays, on the display 12C, information indicating a photographing request for performing photographing at a different photographing angle. The first subject adjusts the angle of the terminal device 12, thereby adjusting the photographing angle of the photographing unit 12A. The first subject operates the input unit 12B, thereby instructing the photographing unit 12A to perform photographing. If the photographing unit 12A acquires another first subject image by photographing, the terminal device 12 transmits the acquired first subject image to the information processing apparatus 10 via the network 16. The controller 20 of the information processing apparatus 10 generates a composite image using the acquired first subject image in the same manner as that described above.

The terminal device 12 that receives the retransmission request may display, on the display 12C, the first subject image and the composition region used in generating the composite image determined not to be output. In this case, the output controller 20F of the information processing apparatus 10 transmits, to the terminal device 12, the retransmission request and the first subject image and the composition region used in generating the composite image determined not to be output.

The first subject who operates the terminal device 12 operates the input unit 12B of the terminal device 12, thereby adjusting at least one of the position and the shape of the displayed composition region. The terminal device 12 transmits the composition region resulting from adjustment and the first subject image to the information processing apparatus 10. The compositor 20E of the information processing apparatus 10 generates a composite image using the first subject image and the composition region received from the terminal device 12 in the same manner as that described above.

As described above, the compositor 20E generates the composite image using the composition region with at least one of its position and its shape adjusted by the first subject. Consequently, the compositor 20E can correct a detection error in detecting the composition region by the detector 20B.

In this case, the compositor 20E may register, in the storage 24, the first subject image and the composition region received from the terminal device 12 as another piece of teaching data. Every time the teaching data in the storage 24 is updated, the learner 20G may generate another learning model using the teaching data. This processing can increase the accuracy of the learning model.

The compositor 20E may readjust the composition position and the color tone of the composite image determined not to be output in the same manner as that described above, thereby generating the composite image again. Furthermore, the compositor 20E may correct the composite image determined not to be output such that the shape of the first subject image used in generation of the composite image is a subject image obtained by performing photographing from another photographing direction (e.g., photographing from a side closer to the head part or the leg part). This correction is keystone correction, for example. The compositor 20E uses the first subject image resulting from correction, thereby generating the composite image again in the same manner as that described above.

The output controller 20F may further output, to the output unit 21, a composite image selected based on the related information provided to the composite image.

The output controller 20F may select, as the composite image to be output, a composite image corresponding to related information satisfying at least one of affinity of equal to or higher than a predetermined value, a user name determined in advance, characteristic information determined in advance, and difference information determined in advance, for example. The compositor 20E may output the selected composite image to the output unit 21.

As described above, the certainty of the composite image is defined by a plurality of parameters, such as the result of a user satisfaction questionnaire on the composite image, the ratio of conversion to an EC site, the repeat ratio, and whether the composite image is saved to the terminal device 12.

As described above, these parameters are input by the first subject who operates the terminal device 12 that displays the composite image.

Operations performed by the first subject on the input unit 12B after viewing the displayed composite image is significantly valuable data. In other words, the result of a user satisfaction questionnaire on the composite image, the ratio of conversion to an EC site, the repeat ratio, and whether the composite image is saved to the terminal device 12 expressed by the parameters described above can be used as information indicating reaction of the first subject to the supplied composite image.

The learner 20G, for example, prepares teaching data indicating correspondence between the characteristics of the first subject in the first subject image and the parameters described above for the composite image generated using the first subject image. Every time the teaching data is updated, the learner 20G learns and updates a learning model for deriving the parameters described above from the characteristics of the first subject by known machine learning. The learner 20G may store the learning model in the storage 24 or transmit it to the external server 14.

By supplying such a learning model, the information processing apparatus 10 can supply information (learning model) for readily deriving the trial object part (a head hair part, a pattern on a skin, or an item) currently in fashion used in composition of the composite image.

By analyzing the learning model, the information processing apparatus 10 can readily determine what kind of trial object part is tried by the first subject with what kind of characteristics. Specifically, the information processing apparatus 10 can readily determine what kind of hairstyles and clothes are preferably tried by the first subject with what kind of characteristics.

The output controller 20F may express the feature amount of the trial object part by a plurality of parameters using a known method. The output controller 20F estimates directivity (vector) of the feature amount of the trial object part from a time-series group of difference between the parameters. The output controller 20F transmits information indicating the estimated directivity of the feature amount to the external server 14, for example. By performing the processing described above, the output controller 20F can readily supply the information for estimating items, hairstyles, patterns, and others likely to come into fashion in the future.

The following describes composition performed by the information processing apparatus 10 according to the present embodiment having the configuration described above. FIG. 3 is a flowchart of an example of the entire procedure of composition according to the present embodiment.

The information processing apparatus 10 prepares a content with which a composition region (e.g., the face region) is to be composited (Step S101). The information processing apparatus 10, for example, acquires the second subject image from the external server 14 and processes the acquired second subject image, thereby generating the content.

The following describes a case where two contents, that is, a clothing content and a hairstyle content are used, for example. The clothing content is a content with which the face region of the user is to be composited. The clothing content can be considered to be a content (second subject image) the trial object part of which is clothes (an example of items). To composite the face region, the clothing content is an image including the face region.

The hairstyle content is a content (third image), such as an image including a hairstyle that can be composited with the clothing content with which the face region of the user is composited. The following describes a case where the face region of the user is composited with the clothing content, and the hairstyle content is then composited with the generated composite image, for example. If the face image of the user is composited with the clothing content including hair, for example, the pixel values of at least part of hair (e.g., bangs) may possibly be changed (e.g., becomes lighter) by the effects of composition. By compositing the hairstyle content after the face is composited, the problem described above can be resolved. The processing of compositing the hairstyle content is not necessarily performed.

The processing for preparing the clothing content and the hairstyle content will be described later in greater detail. The content preparation at Step S101 simply needs to be performed before the processing at Step S102 and subsequent steps starts. The processing at Step S101 and the processing at Step S102 and subsequent steps, for example, are not necessarily performed successively.

Subsequently, the acquirer 20A acquires an image obtained by photographing the user (Step S102). The detector 20B detects the face region of the user from the acquired image, and the corrector 20C processes the face region as needed (Step S103). The compositor 20E composites the face region with the clothing content (Step S104). The compositor 20E composites the hairstyle content with the clothing content with which the face region is composited (Step S105). To perform composition, mask images generated by the generator 20D are used.

Figure 6:
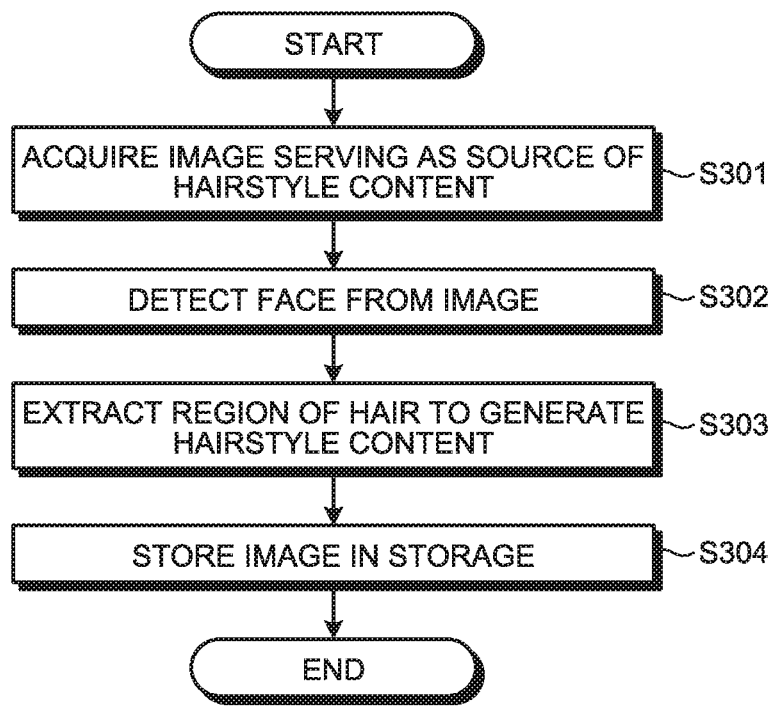
FIG. 6 is a flowchart of an example of processing for preparing a hairstyle content.

The following describes composition illustrated in FIG. 3 in greater detail. FIG. 4 is a flowchart of an example of processing for preparing the clothing content. FIG. 6 is a flowchart of an example of processing for preparing the hairstyle content. The processing illustrated in FIG. 4 and FIG. 6 corresponds to the processing at Step S101 in FIG. 3, for example.

First, the processing for preparing the clothing content (FIG. 4) is described. The acquirer 20A acquires an image of the clothing content from the external server 14, for example (Step S201). The detector 20B detects the face region from the acquired image (Step S202). The detector 20B inputs the image of the clothing content to the learning model, for example, thereby acquiring a plurality of feature points corresponding to parts of the face. The detector 20B may also detect the size and the inclination of the face region, for example, from the information on the detected face region.

Subsequently, the corrector 20C corrects the image of the clothing content (Ssteps S203 and S204). The corrector 20C corrects the image by a technique called Inpainting, for example. Inpainting is a technique of specifying a certain region in a certain image and complementing and restoring the inside of the region by a weighted sum of the pixel values near the region. The applicable technique is not limited to Inpainting.

The corrector 20C generates a mask image by filling regions including parts (e.g., eyes, eyebrows, and a mouth) to be corrected out of the detected parts with the pixel values indicating the objects to be corrected (Step S203). Inpainting corrects the pixels specified with the pixel values indicating the objects to be corrected in the mask image. The corrector 20C uses the generated mask image, thereby correcting the image of the clothing content by an Inpainting algorithm (Step S204). Consequently, the information processing apparatus 10 can obtain an image in which the parts to be corrected (eyes, eyebrows, and a mouth) are complemented by the pixels therearound.

The parts to be filled can be specified by the user, for example. In other words, the user can specify whether to prioritize the parts in the image of the clothing content or the parts in the image of the user. The corrector 20C generates a mask image by filling the parts on which the image of the user is determined to be prioritized. As a result, the user can reflect a desired part out of the parts of his/her face on the composite image.

The corrector 20C stores the image of the clothing content resulting from correction in the storage 24, for example (Step S205). The corrector 20C may store the information indicating the size and the inclination of the face region in a manner associated with the image of the clothing content such that the information can be referred to in composition.

FIG. 5 is a schematic of a specific example of the processing for preparing the clothing content. An image 501 is an example of the image of the clothing content and an image including a plurality of feature points detected from the image. An image 502 is an example of the mask image defining the regions including the eyes, the eyebrows, and the mouth as the objects to be corrected. The white regions in the image 502 are the regions specified with the pixel values indicating the objects to be corrected (regions including the eyes, the eyebrows, and the mouth). An image 503 is an example of the image obtained by applying the Inpainting algorithm to the image 501 and the image 502.

Next, the processing for preparing the hairstyle content (FIG. 6) is described. The acquirer 20A acquires an image serving as a source of the hairstyle content from the external server 14, for example (Step S301). This image includes the hair and the face of a person serving as a model, for example. The detector 20B detects the face region from the acquired image by the same processing as that performed at Step S202 in FIG. 4 (Step S302).

Subsequently, the corrector 20C extracts only the region of the hair from the acquired image, thereby generating the hairstyle content (Step S303). The corrector 20C stores the image of the generated hairstyle content in the storage 24, for example (Step S304). The corrector 20C may store the information indicating the size and the inclination of the face region in a manner associated with the image of the hairstyle content such that the information can be referred to in composition.

Figure 7:
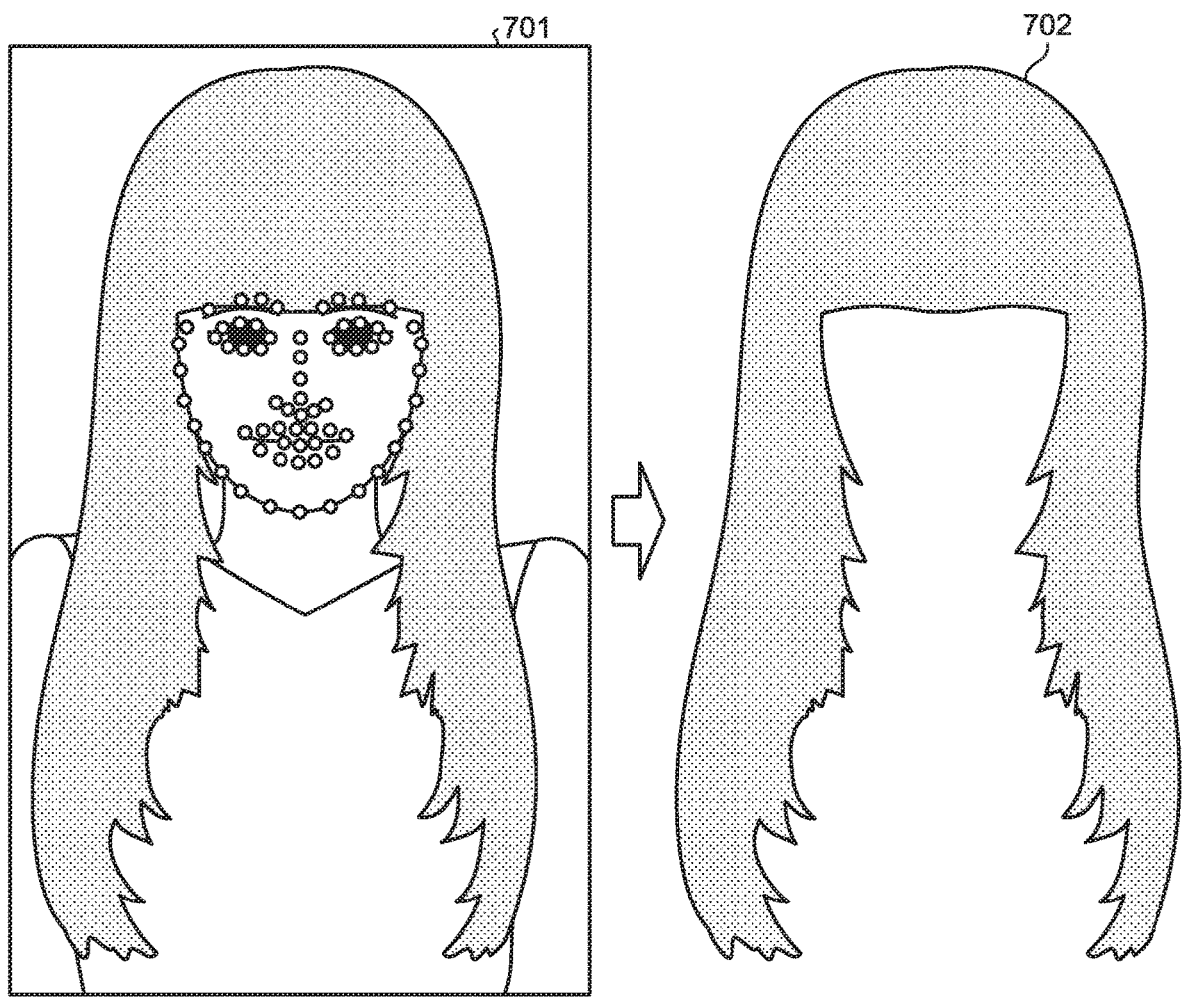
FIG. 7 is a schematic of a specific example of the processing for preparing a hairstyle content.

FIG. 7 is a schematic of a specific example of the processing for preparing the hairstyle content. An image 701 is an example of the image of the hairstyle content. An image 702 is an example of the image of the hairstyle content obtained by extracting only the part of the hair from the image 701.

If the contents created by performing the processing illustrated in FIGS. 4 and 6 are stored in the external server 14, for example, the information processing apparatus 10 may acquire and use the stored contents without performing the content preparation.

Figure 8:
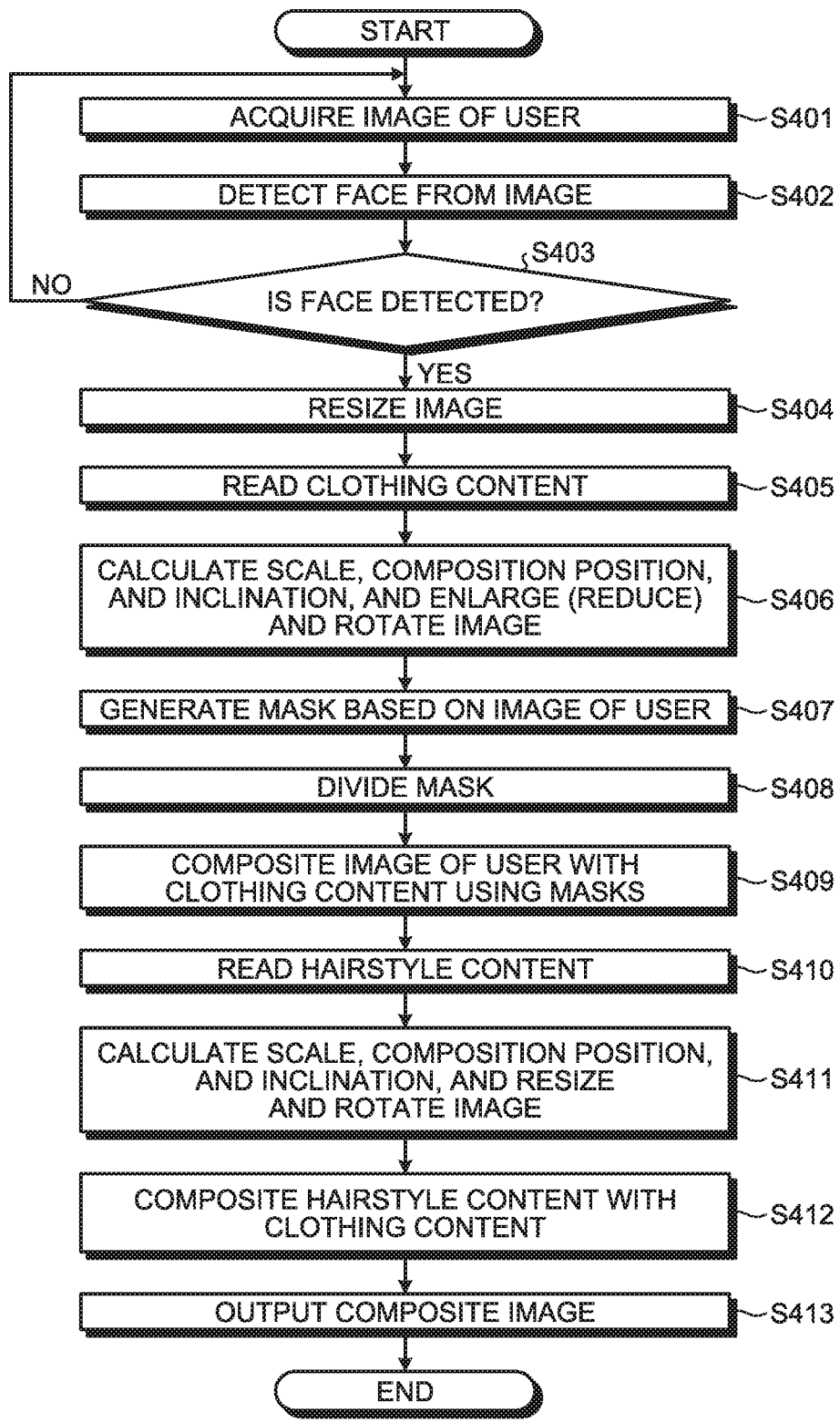
FIG. 8 is a flowchart of a detailed procedure of the composition.

The following describes the processing from Step S102 to Step S105 in the composition illustrated in FIG. 3 in greater detail with reference to FIGS. 8 to 16. FIG. 8 is a flowchart of a detailed procedure of the processing from Step S102 to Step S105.

The acquirer 20A acquires an image (first subject image) obtained by photographing the user from the terminal device 12, for example (Step S401). The detector 20B detects the face region from the acquired image (Step S402). The detector 20B, for example, inputs the image of the user to the learning model, thereby acquiring a plurality of feature points corresponding to parts of the face. The detector 20B may also detect the size and the inclination of the face region, for example, from the information on the detected face region.

Figure 9:
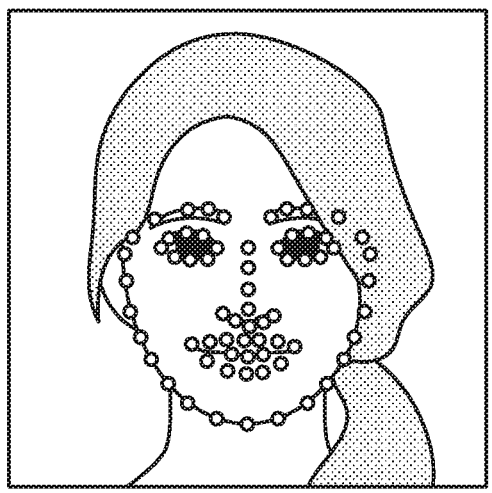
FIG. 9 is a schematic of an example of detected feature points.
Figure 10:
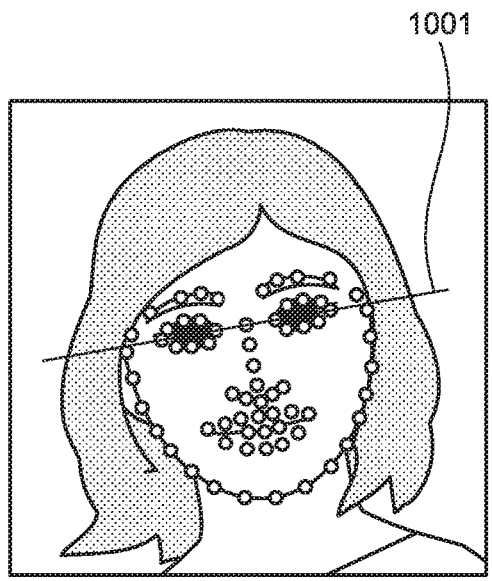
FIG. 10 is a schematic of an example of inclination of a detected face region.

FIG. 9 is a schematic of an example of the detected face region (feature points). As illustrated in FIG. 9, the detector 20B detects, from the face image, a plurality of feature points corresponding to the parts, such as the eyes, the eyebrows, the nose, the mouth, and the chin as information indicating the face region. FIG. 10 is a schematic of an example of the inclination of the detected face region. A line segment 1001 in FIG. 10 is a line segment joining the centers of both eyes. The inclination of the line segment, for example, is used as the inclination of the face region. The center of the eye can be derived by calculating an average of the positions of a plurality of feature points corresponding to the periphery of the eye out of the detected feature points, for example.

Referring back to FIG. 8, the detector 20B determines whether the face region is detected from the image (Step S403). If the face region is not detected (No at Step S403), the process is returned to Step S401, and the acquirer 20A acquires an image of the user again. If the face region is detected (Yes at Step S403), the corrector 20C resizes the whole image of the user (Step S404). If resizing is not required, the processing at Step S404 may be omitted.

The compositor 20E reads an image of the clothing content to be composited from the storage 24 (Step S405). The clothing content to be composited can be specified by the user through the input unit 28, for example.

The corrector 20C corrects the image of the face region to composite it with the object region (Step S406). The corrector 20C, for example, calculates a scale for enlarging or reducing the face region, a composition position of the face region, inclination (angle) of the face region, and inclination of the object region. The corrector 20C enlarges or reduces the face region based on the calculated scale. The corrector 20C moves the face region to the position matching the composition position. The corrector 20C rotates the face region such that the inclination of the face region matches that of the object region.

The scale is calculated as follows, for example. The corrector 20C compares the size of the face region with that of the object region. The sizes of the regions can be determined based on the distance between the positions of the eyes and the position of the mouth detected in the respective regions, for example. The corrector 20C compares the sizes of the regions, thereby calculating the scale for changing the size of the face region such that the sizes of both regions match. The corrector 20C changes the size of the face region based on the calculated scale.

The corrector 20C may calculate respective scales for the region in the vertical direction and the horizontal direction. The corrector 20C, for example, may calculate the scale in the horizontal direction based on the length between both eyes detected in the regions. The corrector 20C may calculate the scale in the vertical direction based on the length of a line segment joining the center of both eyes and the mouth detected in the regions.

The composition position is calculated as follows, for example. The corrector 20C calculates the center position of the face region (object region) detected from the clothing content as the composition position. The center position can be calculated as the middle point of a line segment joining the middle point of a line segment joining the centers of both eye regions and the center of the mouth region, for example. The corrector 20C calculates the center position of the face region detected from the image of the user in the same manner as that described above. The corrector 20C calculates the difference between the center positions in the respective face regions as a moving amount of the face region detected from the image of the user. The corrector 20C moves the face region by the calculated moving amount.

Figure 11:
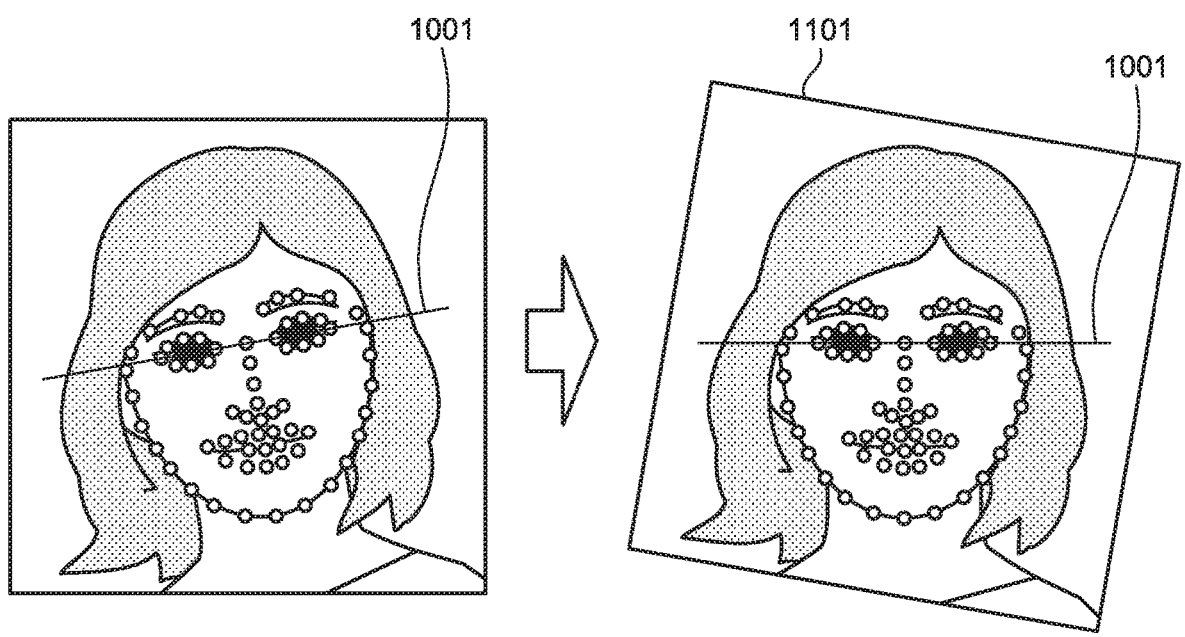
FIG. 11 is a schematic of an example of a rotated image.

The inclination of the face region can be calculated as the inclination of the line segment joining both eyes as described above, for example. An image 1101 in FIG. 11 is an example of an image obtained by rotating the image of the user such that the line segment 1001 matches the inclination (horizontal in this example) of the face region in the clothing content.

Referring back to FIG. 8, the generator 20D uses the face region (feature points) detected from the image of the user to generate a mask image used in poisson image editing (Step S407).

The following describes problems occurring when poisson image editing is employed. As described above, if poisson image editing is employed, a high-quality composite image may possibly fail to be generated due to a great effect of a characteristic color present near a region to be composited. If pixels in a dark color (e.g., glasses and bangs) significantly different from the color of the face region are included near the face region to be composited, for example, the color may possibly have a great effect on the color of the face region.

Figure 12:
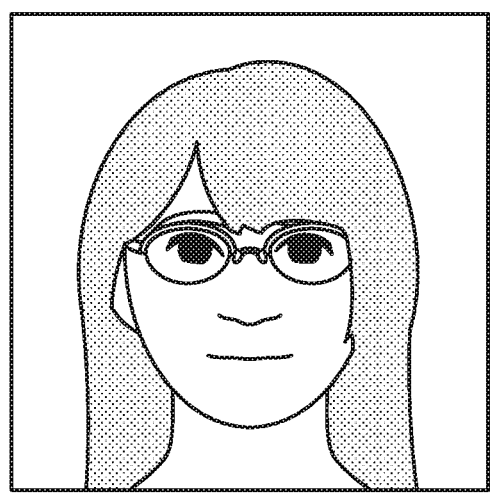
FIG. 12 is a schematic of an example of an image highly likely to have a great effect on the color of the face region.

FIG. 12 is a schematic of an example of an image highly likely to have a great effect on the color of the face region. As illustrated in FIG. 12, if black bangs cover the face region, or if glasses in a dark color are included, for example, the color of the bangs or the glasses has a great effect on the color of the composited face region.

Figure 13:
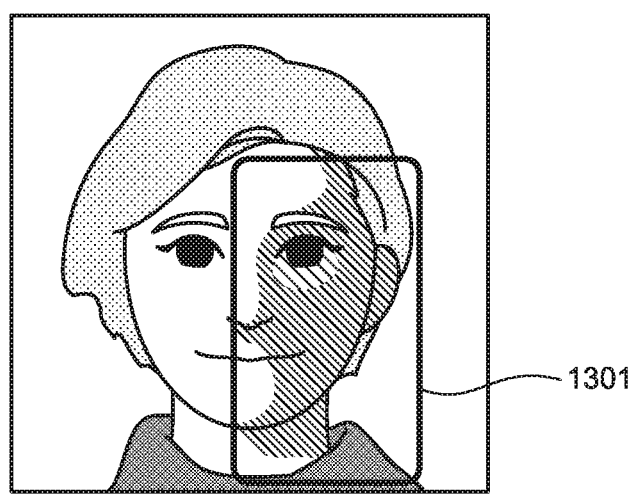
FIG. 13 is a schematic of an example of an image of a clothing content including a shadow.

By contrast, a shadow of the face itself generated depending on the direction of lighting, for example, looks natural by being reflected on the image of the face region resulting from composition. FIG. 13 is a schematic of an example of the image of the clothing content including such a shadow. A region 1301 indicates a region including a shadow of the face.

To address the problem described above, the present embodiment generates a plurality of mask images so as to reduce the effect of the color present near the face region and maintain the effect of the shadow of the face itself, for example, without any change. The present embodiment uses the generated mask images and employs poisson image editing.

The generator 20D, for example, generates one mask image corresponding to the whole face region and divides the mask image, thereby generating a plurality of mask images. The generator 20D acquires feature points corresponding to the contour of the face region out of the feature points detected from the image of the user. The generator 20D, for example, acquires feature points detected as the eyebrows, the left and right cheeks, and the chin, as the feature points indicating the contour. The generator 20D generates one mask image by filing the region surrounded by the contour with the pixel values indicating the object to be composited (Step S407). To emphasize a specified part (e.g., eyebrows) out of the specific parts, the generator 20D may generate a mask image in which the region corresponding to the part is enlarged.

Figure 14:
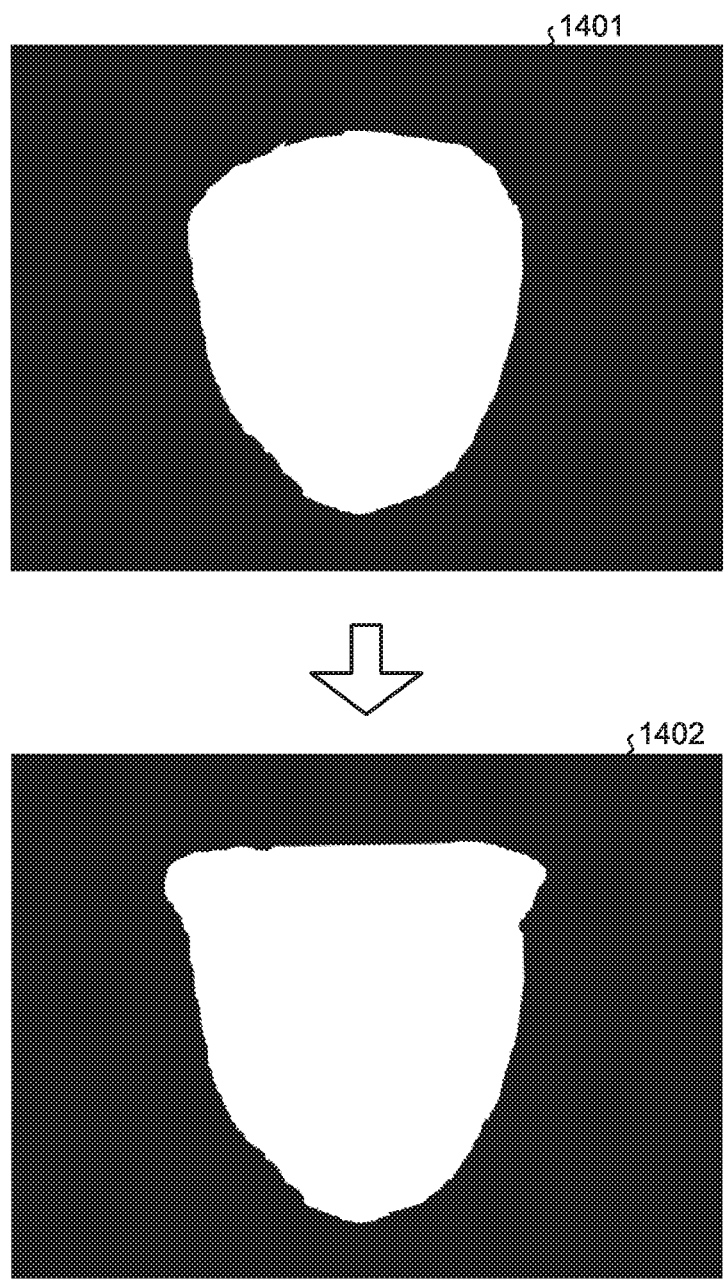
FIG. 14 is a schematic of an example of a generated mask image.

FIG. 14 is a schematic of an example of the generated mask image. An image 1401 is an example of a mask image prior to emphasizing the eyebrow region. An image 1402 is an example of a mask image in which the eyebrow region is emphasized. The part to be emphasized and the degree of emphasis can be determined based on specification by the user, for example.

Referring back to FIG. 8, the generator 20D divides the generated mask image, thereby generating a plurality of mask images (Step S408). The generator 20D, for example, divides one mask image by a line extending in the vertical direction and a line extending in the horizontal direction passing through the center of the face region, thereby generating four mask images. The center position of the face region can be determined using the value calculated by the corrector 20C to correct the image.

The method for generating the mask images is not limited to the method described above. A plurality of mask images simply need to be generated such that a region having higher luminance than that of the other regions out of the regions in the image to be composited is included in a region in contact with another mask image or a region overlapping another mask image. While the region having higher luminance than that of the other regions corresponds to a region including the center of the face region (region including a nose), for example, it may be other regions.

The generator 20D, for example, may divide one mask image generated at Step S407 into four mask images by lines passing through a fixed position assumed to be the center position of the face region (e.g., two lines dividing the mask image at a ratio of 5:5 in the horizontal direction and a ratio of 3:7 from the top in the vertical direction).

By the method of dividing the mask image by the lines passing through the center of the face region, the generator 20D can generate mask images in which a region having higher luminance than that of the other regions (region including the center of the face region) is included in a region in contact with another mask image (region including the boundary with another mask image).

The generator 20D may detect a region having higher luminance than that of the other regions from the face region and generate a plurality of mask images such that the detected region is included in a region in contact with another mask image.

The generator 20D may generate a plurality of mask images such that the mask images each include a region overlapping one another. This processing can suppress a phenomenon that a color at the boundary between a foreground image and a background image has a great effect in composition, for example.

Figure 15:
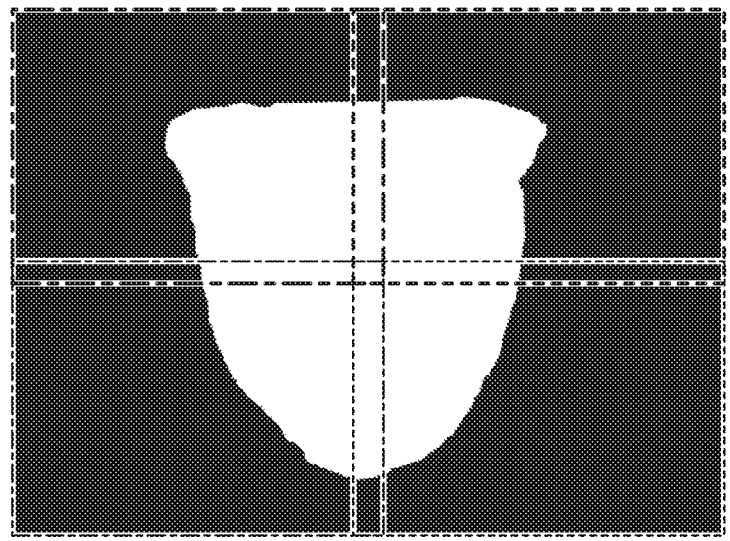
FIG. 15 is a schematic of an example of generated mask images.

FIG. 15 is a schematic of an example of a plurality of mask images generated such that part of their regions overlap one another. FIG. 15 illustrates four mask images of a rectangular region indicated by a thick alternate long and short dash line (upper left), a rectangular region indicated by a thin alternate long and short dash line (lower left), a rectangular region indicated by a thick dashed line (upper right), and a rectangular region indicated by a thin dashed line (lower right). The four mask images overlap one another at portions including the center of the face region, for example. By this method, the mask images are generated in which a region having higher luminance than that of the other regions (region including the center of the face region) is included in a region overlapping another mask image.

In generating a plurality of mask images by dividing a mask image, the number of divided sections is not limited to four, and the mask image is not necessarily divided in both of the horizontal direction and the vertical direction. The mask image may be divided in only one of the horizontal direction and the vertical direction, for example. The number of divided sections may be two, three, or five or more. The number of divided sections and the direction of division are determined based on the properties of the content to be composited, for example.

The mask images do not necessarily have a rectangular shape and may have any desired shape. For example, mask images having a triangular, circular, or elliptic shape may be used.

Referring back to FIG. 8, the compositor 20E composites the image (face region) of the user with the clothing content by poisson image editing using the mask images (Step S409).

To composite the hairstyle content, the following processing is also performed. Specifically, the compositor 20E reads an image of the hairstyle content to be composited from the storage 24 (Step S410). The hairstyle content to be composited can be specified by the user through the input unit 28, for example.

The corrector 20C corrects the image of the hairstyle content to composite it with the object region (Step S411). The processing at Step S411 can be performed by the same procedure performed at Step S406.

The compositor 20E composites the image of the hairstyle content resulting from correction with the image of the clothing content (Step S412). The composition method may be any desired method. The compositor 20E, for example, generates a composite image by a method of overwriting the hairstyle content on the clothing content.

Figure 16:
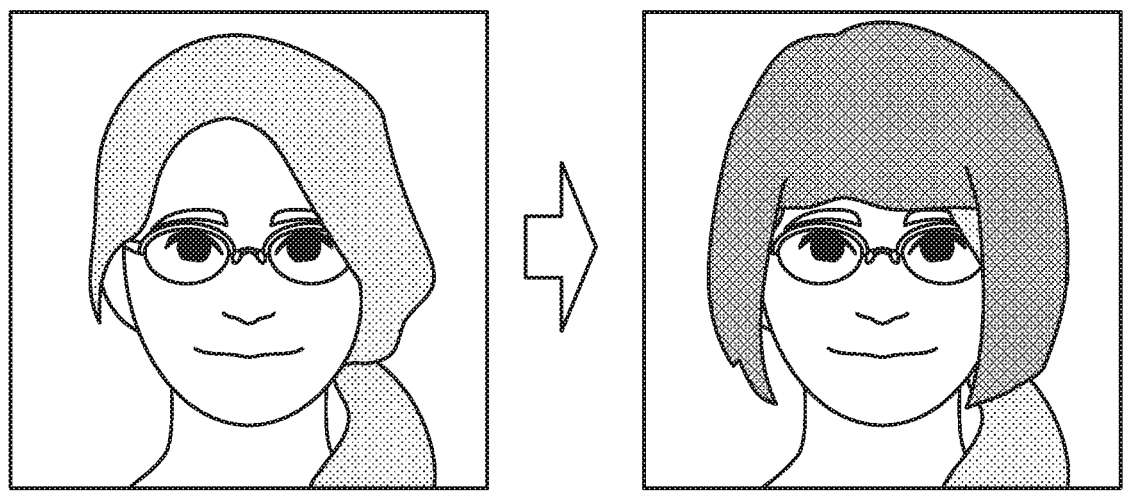
FIG. 16 is a schematic of an example of an image with which a hairstyle content is composited.

The output controller 20F outputs the composite image (Step S413). FIG. 16 is a schematic of an example of an image with which a hairstyle content is composited. The image on the left is an example of the image of the clothing content with which the face region is composited by the processing performed up to the Step S409, and the image on the right is an example the image obtained by compositing the hairstyle content with the image on the left.

As described above, the information processing apparatus 10 according to the present embodiment uses the learning model to detect the composition region from the first subject image. Consequently, the information processing apparatus 10 according to the present embodiment can readily detect the composition region used in composition without acquiring information on the three-dimensional shape of a trier using a depth sensor, for example.

The information processing apparatus 10 according to the present embodiment composites the composition region detected from the first subject image of the first subject who tries various forms with the object region. Consequently, the information processing apparatus 10 according to the present embodiment can readily generate the composite image indicating a state where the first subject virtually tries other forms.

Consequently, the information processing apparatus 10 according to the present embodiment can readily generate the composite image of the subject images (the first subject image and the second subject image).

The information processing apparatus 10 according to the present embodiment uses the first subject image detected from the first subject image acquired from the terminal device 12. As a result, the information processing apparatus 10 can suppress restriction on the first subject image used in composition. In other words, the information processing apparatus 10 according to the present embodiment can use a desired first subject image of the first subject for generation of the composite image.

The information processing apparatus 10 according to the present embodiment generates the composite image by compositing the composition region detected from the first subject image with the object region of the second subject image.

Consequently, the information processing apparatus 10 according to the present embodiment can reduce the amount of image processing compared with the conventional techniques that generate the composite image using three-dimensional shape data obtained by a depth sensor, for example. Consequently, the information processing apparatus 10 according to the present embodiment can reduce a time required for generating the composite image. In other words, the information processing apparatus 10 can provide the first subject with an environment in which the first subject can perform a real-time trial.

The information processing apparatus 10 according to the present embodiment corrects the content acquired from the external server 14, for example, thereby preparing the content (the clothing content and the hairstyle content) used for composition. If the face region detected from the image of the user is the same one, for example, its use is changed by specifying the region or the part to be used for composition. In many cases, the load increases by preparing (generating) the contents corresponding to the respective uses. The present embodiment can generate the content to be composited based on an image of the content readily available by a method, such as cloning, from the external server 14, for example.

The information processing apparatus 10 according to the present embodiment can correct the image by detecting the angle of the face, for example. Consequently, the information processing apparatus 10 can enhance the flexibility of the photographing environment. Furthermore, the information processing apparatus 10 uses a plurality of mask images and performs a composition method, such as poisson image editing. Consequently, if the bangs and the shadow of the user are present near the composition region under an unstable light environment, for example, the information processing apparatus 10 can composite the images while maintaining these characteristics.

First Modification

In the description above, the information processing apparatus 10 composites the composition region (e.g., the face region) detected from the image obtained by photographing the user with the subject image (e.g., the clothing content) acquired from the external server 14, for example. Alternatively, the information processing apparatus 10 may composite a specific part extracted from a face image of a second person, such as a model and an actor, with the face region of the user. The information processing apparatus 10, for example, takes an image including the face of the user and detects the face region from the taken image. The information processing apparatus 10 generates a composite image using the face region as a background image and using a part specified out of the parts, such as eyes, eyebrows, and a mouth, extracted from the face image of the second person as a foreground image. With this configuration, the information processing apparatus 10 enables the user to imitate a favorite actor's makeup and to check a face resulting from plastic surgery predicted prior to the surgery, for example.

Second Modification

At least part of the information stored in the storage 24 in the information processing apparatus 10 according to the embodiment above may be stored in the external server 14. The learner 20G in the information processing apparatus 10 may be included in the external server 14. At least part of the functions of the information processing apparatus 10 may be mounted on the terminal device 12. To mount the functions of the information processing apparatus 10 on the terminal device 12, the terminal device 12 preferably includes a graphics processing unit (GPU) in view of increasing the processing speed.

Third Modification

An information processing program executed by the information processing apparatus 10 according to the present embodiment may be provided as an application used by a Web server and a management server of a social networking service (SNS). In this case, the user, such as the first subject, uses the application through the terminal device 12, thereby readily viewing various composite images. Furthermore, the information processing program can supply the composite image as an avatar image serving as an alter ego of the first subject. Consequently, the information processing program according to the present embodiment can readily supply information available for advertisements and various campaigns for the item in the composite image, for example.

Application objects Objects to which the information processing system 1 according to the present embodiment is applied are not particularly limited. The information processing system 1 is applicable to various equipment installed in an area that provides services relating to the trial object part (the hair part, the skin part, or the item), for example. The information processing system 1 is applicable to systems installed in beauty salons, apparel industries, entertainment facilities, and event facilities, for example.

Hardware Configuration

Figure 17:
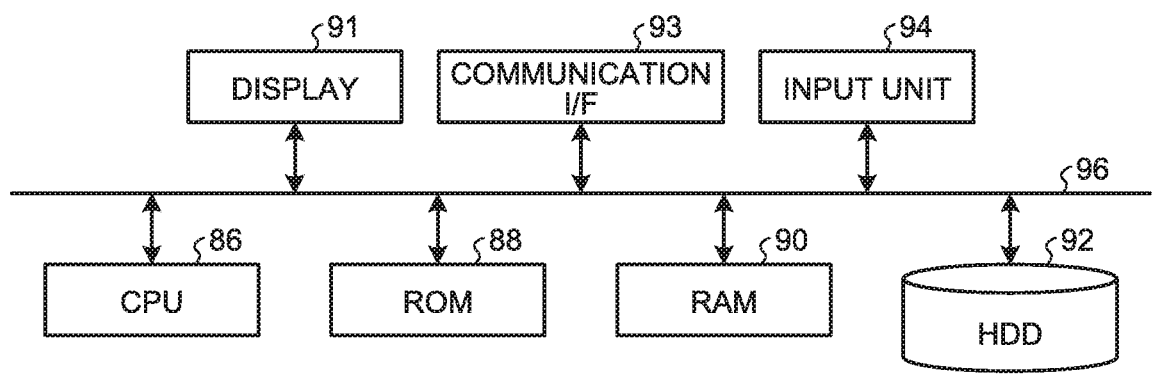
FIG. 17 is a block diagram of an exemplary hardware configuration of the information processing apparatus, a terminal device, and an external server.

The following describes a hardware configuration of the information processing apparatus 10 according to the present embodiment and the modifications thereof, the terminal device 12, and the external server 14. FIG. 17 is a block diagram of an exemplary hardware configuration of the information processing apparatus 10 according to the present embodiment and the modifications thereof, the terminal device 12, and the external server 14.

In the information processing apparatus 10 according to the present embodiment and the modifications thereof, the terminal device 12, and the external server 14, a display 91, a communication I/F 93, an input unit 94, a CPU 86, a read only memory (ROM) 88, a RAM 90, and an HDD 92, for example, are connected to one another via a bus 96. The information processing apparatus 10, the terminal device 12, and the external server 14 have a hardware configuration using a typical computer.

The CPU 86 is an arithmetic device that controls various kinds of processing in the information processing apparatus 10 according to the present embodiment and the modifications thereof, the terminal device 12, and the external server 14. The RAM 90 stores therein data required for various kinds of processing by the CPU 86. The ROM 88 stores therein a computer program and the like for performing the various kinds of processing by the CPU 86. The HDD 92 stores therein data to be stored in the storage 24. The communication I/F 93 is an interface connected to an external device and an external terminal via a communication line, for example, to transmit and receive data to and from the external device and the external terminal connected thereto. The display 91 corresponds to the display 26 and the display 12C. The input unit 94 receives operating instructions from the user. The input unit 94 corresponds to the input unit 12B and the input unit 28.

The computer program for performing the various kinds of processing executed by the information processing apparatus 10 according to the present embodiment and the modifications thereof, the terminal device 12, and the external server 14 is embedded and provided in the ROM 88, for example. The computer program includes the information processing program.

The computer program executed by the information processing apparatus 10 according to the present embodiment and the modifications thereof, the terminal device 12, and the external server 14 may be recorded and provided in a computer-readable recording medium, such as a compact disc read only memory (CD-ROM), a flexible disk (FD), a compact disc recordable (CD-R), and a digital versatile disc (DVD), as an installable or executable file.

The computer program executed by the information processing apparatus 10 according to the present embodiment and the modifications thereof, the terminal device 12, and the external server 14 may be stored in a computer connected to a network, such as the Internet, and provided by being downloaded via the network. Furthermore, the computer program for performing the processing described above in the information processing apparatus 10 according to the present embodiment and the modifications thereof, the terminal device 12, and the external server 14 may be provided or distributed via a network, such as the Internet.

The computer program for performing the processing described above executed by the information processing apparatus 10 according to the present embodiment and the modifications thereof, the terminal device 12, and the external server 14 generates the units described above on the main memory.

The various kinds of information stored in the HDD 92 may be stored in an external device. In this case, the external device and the CPU 86 are connected via a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a detector configured to detect a first image region including a specific part of a subject from a first image obtained by photographing the subject;
   a generator configured to generate one to-be-divided mask image including the first image region and to divide the to-be-divided mask image to generate a plurality of mask images for specifying a region to be composited with a second image including the first image region; and
   a compositor configured to composite the first image with the second image using the plurality of mask images, wherein
      the plurality of mask images each include a region having higher luminance than luminance of other regions out of regions of the first image, in a region in contact with a second mask image or a region overlapping the second mask image;
      the subject is a face, and
      the plurality of mask images each include a region including a center of the face out of the regions of the first image, in a region in contact with the second mask image or a region overlapping the second mask image.

2. The information processing apparatus according to claim 1, wherein
   the detector detects a second image region including the specific part from the second image,
   the information processing apparatus further comprises a corrector configured to correct a first pixel value of the second image region based on a second pixel value of a pixel around the second image region to yield a corrected first pixel value, and
   the compositor composites the first image with the second image having the corrected first pixel value.

3. The information processing apparatus according to claim 1, wherein
   the second image is an image obtained by photographing a face,
   the specific part is at least one of an eye, an eyebrow, or a mouth, and
   the compositor further composites a third image indicating a hairstyle with the second image with which the first image is composited.

4. An information processing method comprising:
   detecting a first image region including a specific part of a subject from a first image obtained by photographing the subject;
   generating one to-be-divided mask image including the first image region;
   dividing the to-be-divided mask image to generate a plurality of mask images for specifying a region to be composited with a second image including the first image region; and
   compositing the first image with the second image using the plurality of mask images, wherein
      the plurality of mask images each include a region having higher luminance than luminance of other regions out of regions of the first image, in a region in contact with a second mask image or a region overlapping the second mask image,
      the subject is a face, and
      the plurality of mask images each include a region including a center of the face out of the regions of the first image, in a region in contact with the second mask image or a region overlapping the second mask image.

5. A computer program product having a non-transitory computer readable medium including programmed instructions for searching for data, wherein
   the instructions, in response to execution by a computer, cause the computer to perform operations, the operations comprising:

detecting a first image region including a specific part of a subject from a first image obtained by photographing the subject;

generating one to-be-divided mask image including the first image region;

dividing the to-be-divided mask image to generate a plurality of mask images for specifying a region to be composited with a second image including the first image region; and compositing the first image with the second image using the plurality of mask images, and the plurality of mask images each include a region having higher luminance than luminance of other regions out of regions of the first image, in a region in contact with a second mask image or a region overlapping the second mask image, the subject is a face, and the plurality of mask images each include a region including a center of the face out of the regions of the first image, in a region in contact with the second mask image or a region overlapping the second mask image.

\* \* \* \* \*